(12) United States Patent
Mazich et al.

(10) Patent No.: US 11,155,673 B2
(45) Date of Patent: *Oct. 26, 2021

(54) CONTROLLED GLASS TRANSITION POLYMERIC MATERIAL AND METHOD

(71) Applicant: Zephyros, Inc., Romeo, MI (US)

(72) Inventors: Kenneth A. Mazich, Birmingham, MI (US); Laurent Meistermann, Ostwald (FR); Craig Chiemelewski, Shelby Township, MI (US)

(73) Assignee: ZEPHYROS, INC., Romeo, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/773,804

(22) PCT Filed: Nov. 11, 2016

(86) PCT No.: PCT/US2016/061588
§ 371 (c)(1),
(2) Date: May 4, 2018

(87) PCT Pub. No.: WO2017/083690
PCT Pub. Date: May 18, 2017

(65) Prior Publication Data
US 2018/0319928 A1    Nov. 8, 2018

Related U.S. Application Data

(60) Provisional application No. 62/254,369, filed on Nov. 12, 2015, provisional application No. 62/288,579, filed on Jan. 29, 2016.

(51) Int. Cl.
*C08G 59/24* (2006.01)
*C08G 59/30* (2006.01)
(Continued)

(52) U.S. Cl.
CPC ........... *C08G 59/245* (2013.01); *C08G 59/28* (2013.01); *C08G 59/302* (2013.01); *C08G 59/50* (2013.01);
(Continued)

(58) Field of Classification Search
CPC .... C08G 59/245; C08G 59/28; C08G 59/302; C08G 59/50; C08G 59/62; C08G 59/621;
(Continued)

(56) References Cited

U.S. PATENT DOCUMENTS 625,559 A    5/1899  Keeler
3,317,471 A  5/1967  Johnson et al.
(Continued)

FOREIGN PATENT DOCUMENTS

CN    1433443 A       7/2003
CN    101418205 A  *  4/2009    ........... C08K 5/3445
(Continued)

OTHER PUBLICATIONS

Hexion Specialty Chemicals, Inc., "EPON Resin 828", 2005 (Year: 2005).*

(Continued)

*Primary Examiner* — David T Karst
(74) *Attorney, Agent, or Firm* — The Dobrusin Law Firm, P.C.

(57) ABSTRACT

The present teachings contemplate relatively high glass transition temperature ($T_g$) polymers and/or other reaction products. A method may include reacting a diepoxide with a bisphenol in amounts and under conditions to produce a material that has a $T_g$ as measured by differential scanning calorimetry according to ASTM E1358-08(2014) of at least about 90° C. at least about 100° C. (at least about 110° C., or at least about 120° C.

11 Claims, 1 Drawing Sheet

(51) Int. Cl.
  *C08G 59/68* (2006.01)
  *C08G 59/62* (2006.01)
  *C08G 59/28* (2006.01)
  *C08G 59/50* (2006.01)
  *C08G 59/64* (2006.01)

(52) U.S. Cl.
  CPC ........... *C08G 59/62* (2013.01); *C08G 59/621* (2013.01); *C08G 59/64* (2013.01); *C08G 59/68* (2013.01); *C08G 59/686* (2013.01); *C08G 59/688* (2013.01)

(58) Field of Classification Search
  CPC ...... C08G 59/64; C08G 59/68; C08G 59/686; C08G 59/688
  USPC .......................................................... 528/89
  See application file for complete search history.

(56) References Cited

U.S. PATENT DOCUMENTS

| | | |
|---|---|---|
| 3,473,950 A | 10/1969 | Wong |
| 3,485,282 A | 12/1969 | Lopez et al. |
| 3,738,862 A | 6/1973 | Klarquist et al. |
| 4,093,491 A | 6/1978 | Whelpton |
| 4,105,634 A * | 8/1978 | Hanson ............... C08G 59/066 525/523 |
| 4,438,254 A | 3/1984 | Doorakian |
| 4,443,507 A | 4/1984 | Yamada |
| 4,501,856 A | 2/1985 | Harpell |
| 4,507,461 A | 3/1985 | Bowditch |
| 4,612,156 A | 9/1986 | Heinemeyer et al. |
| 4,647,648 A | 3/1987 | Silvis et al. |
| 4,800,643 A | 1/1989 | Higgins |
| 4,978,562 A | 12/1990 | Wycech |
| 4,981,735 A | 1/1991 | Rickson |
| 4,992,525 A | 2/1991 | Kriessmann et al. |
| 5,089,588 A | 2/1992 | White et al. |
| 5,115,075 A | 5/1992 | Brennan et al. |
| 5,134,201 A | 7/1992 | Billovits et al. |
| 5,164,472 A | 11/1992 | White et al. |
| 5,240,543 A | 8/1993 | Fetterhoff et al. |
| 5,266,133 A | 11/1993 | Hanley et al. |
| 5,275,853 A | 1/1994 | Silvis et al. |
| 5,401,814 A | 3/1995 | Schomaker |
| 5,464,924 A | 11/1995 | Silvis et al. |
| 5,648,401 A | 7/1997 | Czaplicki et al. |
| 5,686,551 A | 11/1997 | White et al. |
| 5,708,042 A | 1/1998 | Hasegawa |
| 5,731,094 A | 3/1998 | Brennan et al. |
| 5,741,042 A | 4/1998 | Livingston et al. |
| 5,766,719 A | 6/1998 | Rimkus |
| 5,834,078 A | 11/1998 | Cavitt et al. |
| 5,852,163 A | 12/1998 | Chen et al. |
| 5,962,093 A | 10/1999 | White et al. |
| 5,962,621 A | 10/1999 | Beckerdite et al. |
| 6,011,111 A | 1/2000 | Brennan et al. |
| 6,180,715 B1 | 1/2001 | Schmidt |
| 6,270,600 B1 | 8/2001 | Wycech |
| 6,287,666 B1 | 9/2001 | Wycech |
| 6,365,079 B1 | 4/2002 | Winkler et al. |
| 6,376,583 B1 | 4/2002 | Winkler et al. |
| 6,391,408 B1 | 5/2002 | Hutchinson |
| 6,407,225 B1 | 6/2002 | Mang et al. |
| 6,455,116 B1 | 9/2002 | Xia et al. |
| 6,455,146 B1 | 9/2002 | Fitzgerald |
| 6,589,621 B1 | 7/2003 | Beckerdite et al. |
| 6,723,443 B2 | 4/2004 | Tsai et al. |
| 6,730,713 B2 | 5/2004 | Czaplicki |
| 6,803,004 B1 | 10/2004 | Bochan |
| 6,811,864 B2 | 11/2004 | Czaplicki et al. |
| 6,846,559 B2 | 1/2005 | Czaplicki et al. |
| 6,855,652 B2 | 2/2005 | Hable et al. |
| 7,125,461 B2 | 10/2006 | Czaplicki et al. |
| 7,150,902 B2 | 12/2006 | Farha |
| 7,318,873 B2 | 1/2008 | Czaplicki et al. |
| 7,581,932 B2 | 9/2009 | Coupe et al. |
| 7,784,186 B2 | 8/2010 | White et al. |
| 7,879,925 B2 | 2/2011 | Chmielewski et al. |
| 7,892,396 B2 | 2/2011 | Sheasley |
| 8,430,448 B2 | 4/2013 | Richardson et al. |
| 9,745,412 B2 | 8/2017 | Tsujimura |
| 9,586,363 B2 | 10/2017 | Gleyal et al. |
| 10,137,676 B2 | 11/2018 | Siboni et al. |
| 2002/0006755 A1 | 1/2002 | North et al. |
| 2002/0009937 A1 | 1/2002 | Dukes et al. |
| 2002/0024233 A1 | 2/2002 | Kleino |
| 2003/0039792 A1 | 2/2003 | Hable et al. |
| 2003/0045620 A1 | 3/2003 | Carlson et al. |
| 2003/0099826 A1 | 5/2003 | Juras et al. |
| 2003/0184121 A1 | 10/2003 | Czaplicki et al. |
| 2004/0131840 A1 | 7/2004 | Ferguson et al. |
| 2004/0221953 A1 | 11/2004 | Czaplicki et al. |
| 2007/0027233 A1 | 2/2007 | Yamaguchi et al. |
| 2007/0090560 A1 | 4/2007 | Kassa |
| 2007/0270515 A1 | 11/2007 | Chmielewski et al. |
| 2008/0029214 A1 | 2/2008 | Hable et al. |
| 2008/0060742 A1 | 3/2008 | Sheasley et al. |
| 2009/0202294 A1 | 8/2009 | Apfel |
| 2009/0258217 A1 | 10/2009 | Hoefflin |
| 2009/0298974 A1 | 12/2009 | Chmielewski et al. |
| 2010/0289242 A1 | 11/2010 | Nitsche et al. |
| 2010/0316875 A1 | 12/2010 | Lamon |
| 2011/0039470 A1 | 2/2011 | Wakeman et al. |
| 2011/0220267 A1 | 9/2011 | Blancaneaux |
| 2011/0278802 A1 | 11/2011 | Nitsche et al. |
| 2012/0048451 A1 | 3/2012 | Carlson |
| 2012/0128976 A1 | 5/2012 | Steele |
| 2012/0251863 A1 | 10/2012 | Berger et al. |
| 2013/0020019 A1 | 1/2013 | Nogues et al. |
| 2013/0005946 A1 | 3/2013 | Ardiff |
| 2015/0096663 A1 | 4/2015 | Siboni et al. |
| 2015/0096678 A1 | 4/2015 | Siboni et al. |
| 2015/0129116 A1 | 5/2015 | Richeton |
| 2015/0165737 A1 | 6/2015 | Richardson et al. |
| 2015/0210846 A1 | 7/2015 | Qi et al. |
| 2016/0039192 A1 | 2/2016 | Gleyal et al. |
| 2016/0046047 A1 | 2/2016 | Gleyal et al. |
| 2016/0229965 A1 | 8/2016 | Chmielewski et al. |
| 2016/0273160 A1 | 9/2016 | Braymand et al. |
| 2017/0050365 A1 | 2/2017 | Richardson |
| 2017/0247821 A1 | 8/2017 | Siboni et al. |
| 2018/0036970 A1 | 2/2018 | Chmielewski et al. |
| 2018/0037703 A1 | 2/2018 | Richardson et al. |

FOREIGN PATENT DOCUMENTS

| | | |
|---|---|---|
| CN | 101913255 A | 12/2010 |
| CN | 102766343 A | 11/2012 |
| DE | 3012288 A1 | 10/1981 |
| EP | 0 213 592 A2 | 3/1987 |
| EP | 0 479 445 A2 | 4/1992 |
| EP | 1356911 A2 | 10/2003 |
| EP | 1607204 A2 | 12/2005 |
| EP | 1916285 A1 | 4/2008 |
| JP | H11348160 A | 12/1999 |
| WO | 95/25005 | 9/1995 |
| WO | 98/14498 | 4/1998 |
| WO | 98/36944 | 8/1998 |
| WO | 00/46017 | 8/2000 |
| WO | 2005/058573 A1 | 6/2005 |
| WO | 2007/008569 A1 | 1/2007 |
| WO | 2007/117663 A2 | 10/2007 |
| WO | 2008/010823 A2 | 1/2008 |
| WO | 2008/016889 A1 | 2/2008 |
| WO | 2008/078003 A1 | 7/2008 |
| WO | 2009/058295 A2 | 5/2009 |
| WO | 2009/124709 A1 | 10/2009 |
| WO | 2009/127638 | 10/2009 |
| WO | 2010/040499 A1 | 4/2010 |
| WO | 2010/054194 | 5/2010 |

(56) References Cited

FOREIGN PATENT DOCUMENTS

| WO | 2010/071525 A1 | 6/2010 |
|---|---|---|
| WO | 2011/141148 A2 | 11/2011 |

OTHER PUBLICATIONS

Wang et al., CN 101418205 A machine translation English, Apr. 29, 2009 (Year: 2009).*
PCT Search Report & Written Opinion dated Feb. 13, 2017, Application No. PCT/US2016/061588.
Chinese Office Action dated Jun. 6, 2019, Application No. 201580043486.X.
White et al.; Epoxy Based Thermoplastics: New Polymers with Unusual Property Profiles; ACS Symposium Series 755 Specialty Monomers and Polymers, pp. 132-146 (2000).
H. Craig Silvis & Jerry E. White "Synthesis and Properties of Thermoplastic Poly(amino ether) Barrier Resins"; Polymer News, 1998, vol. 23, pp. 6-10.
"New Dow Resins Combine Qualities of Epoxies and Thermoplastics"; Beverage Online dated Dec. 16, 1999.
New Resin on Blox Opens Avenues for Dow; Plastic News, Dec. 20, 1999, vol. 11, Issue 44, p. 4.
Specialty Monomers and Polymers, Synthesis, Properties, and Applications, 2000, Kathleen O. Havelka, ACS Symposium Series 755.
Jerry E. White "Poly (hydroxyaminoethers): A New Family of Epoxy-Based Thermoplastics"; Advanced Materials Dec. 1, 2000.
J. E. White, "Development of New Family Thermoplastics Employing poly(hydroxyamino ether) chemistry", Plastics, Rubber and Composites, 2000, vol. 29.
Susan A. Somers, "PHAE Blox Resins Produced via Reactice Extrusion; Results from a Designed Experiment on a ZSK-40 mm Co-Rotating Twin-Screw Extruder", Mar. 1, 2002, Dow Confidential Information.
Francois Constantin; "Blends of a New Thermoplastic in a Thermoset Epoxy Matrix"; Macromol Symp. 2003, 198 335-344.
Francois Constantin; "Post-Crosslinkable Blends: Reactions Between a Linear Poly(hydroxyl-amino ether) and a Diepoxy" dated Jun. 11, 2004.
Plastics Technology, "Adhesive Maker Develops Thermoplastic Epoxy WPC", dated Feb. 2009.
ICIS.Com, "Trusted Market Intelligence for the Global Chemical and Energy Industries", Dec. 16, 2002.
Jean-Pierre Pascault, "General Concepts and Epoxy Polymers", 2010.
Jerry E. White, "Thermoplastic Epoxy Polymers", 2010.
U.S. Appl. No. 62/010,662, filed Jun. 11, 2014.
U.S. Appl. No. 62/012,573, filed Jun. 16, 2014.
U.S. Appl. No. 62/042,497, filed Aug. 27, 2015.
International Search Report and Written Opinion from the European Patent Office for Application No. PCT/US2015/045196, dated Oct. 23, 2015.
Chinese Office Action dated Mar. 15, 2018, Application No. 201580043486.X.
European Office Action dated Feb. 9, 2018, Application No. 15756739.7.
Araldite Standard: Two Component Epoxy Adhesive, Oct. 2011, Huntsman Advanced Materials.
Araldite LY 5052/Aradur 5052 Cold Curing Epoxy Systems, Oct. 2010, Huntsman Advanced Materials.
Product page for IKEA Poang Chair, 2019.
Barrie Dickinison, Cut from a Different Cloth, Feb. 15, 2007, Tesla Motor Blog.
International Search Report for application No. PCT/US2015/056826. dated Mar. 15, 2016.
Chinese First Office Action dated Mar. 20, 2018, Application No. CN201580057576.4.
Chinese Second Office Action dated Nov. 9, 2018, Application No. CN201580057576.4.
Chinese Search Report dated Feb. 26, 2019, Application No. 2016800148773.
Chinese First Office Action dated Mar. 20, 2019, Application No. 2016800148773.
International Search Report for application PCT/US2016/021725. dated Aug. 9, 2016.
International Search Report and Written Opinion from the European Patent Office for Application No. PCT/US2016/021721, dated Aug. 16, 2016.
Chinese First Office Action dated Dec. 24, 2019, Application No. 201680066144.4.
Chinese Second Office Action dated Sep. 11, 2020, Application No. 201680066144.4.
Indian First Examination Report dated Jul. 7, 2020, Application No. 201837017354.

\* cited by examiner

CONTROLLED GLASS TRANSITION POLYMERIC MATERIAL AND METHOD

TECHNICAL FIELD

The present teachings relate generally to a reformable resin material system, particularly a system that broadly contemplates particular ingredients for use as reactants, reactions and reaction products associated with polymers having an epoxide functionality for imparting at least one mechanical characteristic consistent with epoxy thermoset materials, and at least one processing (e.g., elevated temperature processing) characteristic typically associated with thermoplastic materials (e.g., a glass transition temperature); in particular the teachings relate to a thermoplastic epoxy polymer, and even more particularly to a thermoplastic epoxy polymer system having a controllable glass transition temperature rendering it suitable for numerous applications, including applications in transportation vehicles (e.g., in automotive vehicle applications), and/or other applications such as aerospace or sporting goods.

BACKGROUND

Thermoplastic polymers having at least one epoxide group have been described in U.S. Pat. Nos. 5,115,075; 4,438,254; 6,011,111; and WO 98/14498 (see, e.g., pages 3-8) along with illustrative synthesis conditions, all incorporated by reference herein (see also U.S. Pat. Nos. 3,317,471 and 4,647,648, also incorporated by reference herein). Examples of such materials also can be found, without limitation at paragraphs 15-25 of Published U.S. Patent Application No. 2007/0270515 (Chmielewski et al.), incorporated by reference for all purposes.

The use of such thermoplastic polymers in a composite material has been disclosed in WIPO Patent Application WO/2008/010823 (addressing in situ reaction of an epoxy and an amine after impregnation), incorporated by reference herein. See also, United States Patent Application No. 2009/0298974 (incorporated by reference).

U.S. Pat. Nos. 4,992,525; 5,648,401; and 6,730,713 may also be relevant to the present teachings, and are all incorporated by reference for all purposes.

Notwithstanding the above teachings, there has remained a need for additional thermoplastic polymeric material systems that exhibit a controllable glass transition temperature in their polymer reaction products, such as a relatively high glass transition temperature (e.g., greater than about 90° C.), as measured by differential scanning calorimetry according to ASTM E1356-08(2014). There has remained a need for thermoplastic polymeric materials that are relatively easy to make, relatively easy to process, exhibit attractive mechanical properties, exhibit a degree of transparency, and/or have suitable surface characteristics to provide a printable substrate, and which also exhibit a high glass transition temperature (e.g., greater than about 90° C.), as measured by differential scanning calorimetry according to ASTM E1356-08(2014). For example, there is a need for a thermoplastic polymer (e.g., one having at least one epoxide functionality) and having a predetermined and controlled glass transition temperature (e.g., a relatively high glass transition temperature) and at least one or any combination of the following characteristics: a stress at break (according to ASTM D638-14) of at least about 60 MPa (e.g., at least about 75 MPa), a tensile elongation at break (according to ASTM D638-14) of at least about 60 (e.g., at least about 75 MPa) and/or a modulus of elasticity (according to ASTM D638-14) of at least about 1 GPa (e.g., at least about 2.7 GPa).

Efforts to address glass transition temperatures have been described in U.S. Pat. No. 5,401,814, incorporated by reference, in which there is emphasized a criticality of certain catalysts and reaction conditions for reacting particular reactants. See also, U.S. Pat. No. 6,803,004 (addressing reactive extrusion).

SUMMARY

One or more of the above needs are met by the present teachings which contemplate materials systems, including a method, ingredients for reactants, resulting reaction product and materials employing the reaction product. In brief, the material system of the present teachings is envisioned to provide a resulting polymeric material that can be processed at elevated temperatures consistent with a typical thermoplastic, but has one or more characteristics (e.g., mechanical characteristics) typically associated with a thermoset material, such as an epoxy-based polymeric material. The resulting polymeric material (which can be regarded as a thermoplastic polymeric material due to its elevated temperature processing characteristics) has a controlled glass transition temperature ("$T_g$"), as measured by differential scanning calorimetry according to ASTM E1356-08(2014). For example, the $T_g$ may be relatively high as compared with other reformable resin materials, particularly ones having an epoxide functionality.

The polymeric material of the reaction product may exhibit one or any combination of the following characteristics: a tensile strength at yield (according to ASTM D60838-14) of at least about 15 MPa (e.g., at least about 30 MPa or 45 MPa), a tensile elongation strength at break (according to ASTM D638-14) of at least about 45 MPa (e.g., at least about 60 or 75 MPa); an elongation at break (according to ASTM D638-14) of at least about 15% (e.g., at least about 30%, 50 or 75%); and/or a tensile modulus of elasticity (according to ASTM D638-14) of at least about 0.5 GPa (e.g., at least about 1 GPa, 1.8 GPa, or 2.7 GPa).

Turning to one contemplated reaction, materials of the teachings herein may be a reaction product of at least one diepoxide, and at least one bisphenol in quantities and under conditions sufficient to achieve the relatively high $T_g$ (e.g., as compared with other reformable resin materials, particularly ones having an epoxide functionality). The reaction may be substantially free or completely free of any iminium catalyst in relation to at least one other catalyst employed. For example, the reaction may employ a non-iminium phosphine catalyst (e.g., triphenylphosphine). The reaction may be substantially free or completely free of any catalyst. The reaction of the teachings herein may be completely free of any amine or amine adduct as a reactant or at least contain amine in an amount that is less than about 10%, less than about 5%, or even less than about 3% of the total moles of reactants. The reaction may be in the substantial or complete absence of any solvent (e.g., the reaction avoids adding any ingredient that would function to dissolve any or all of the ingredients that are reactants; it being recognized that the at least one diepoxide and/or the at least one bisphenol may intrinsically perform such functions, but shall not be regarded as a solvent herein). It may be at a temperature below about 300° C. Other benefits and advantages are realized as well. The teachings herein also contemplate a polymer, and/or a reaction product made in accordance with the disclosed method of the present teachings. Moreover, the teachings contemplate compounded materials that include at least one reaction product of the present teachings in combination with one or more other ingredients (e.g., a polyolefin, an epoxide-containing polymer (which may be a thermoset), a curing agent, a blowing agent, a filler, a reinforcement, or any combination thereof). The teachings contemplate the reaction product of the present teachings in one or more different forms, such as a pellet, a dispersion, a fiber, a tape, an elongated bead, a film, a weave, a felt, or any combination thereof. The properties of the materials of the present materials system (e.g., reaction product materials) also lend the materials to use a feed material for an additive manufacturing process (e.g., as an elongated preform that is extruded for layer by layer buildup of an article, as a dispersed element in a printing ink adapted for layer by layer buildup of an article, as a pellet or other particulated form for delivery to an extruder die configured for layer by layer buildup of an article.

DETAILED DESCRIPTION

Figure 1:
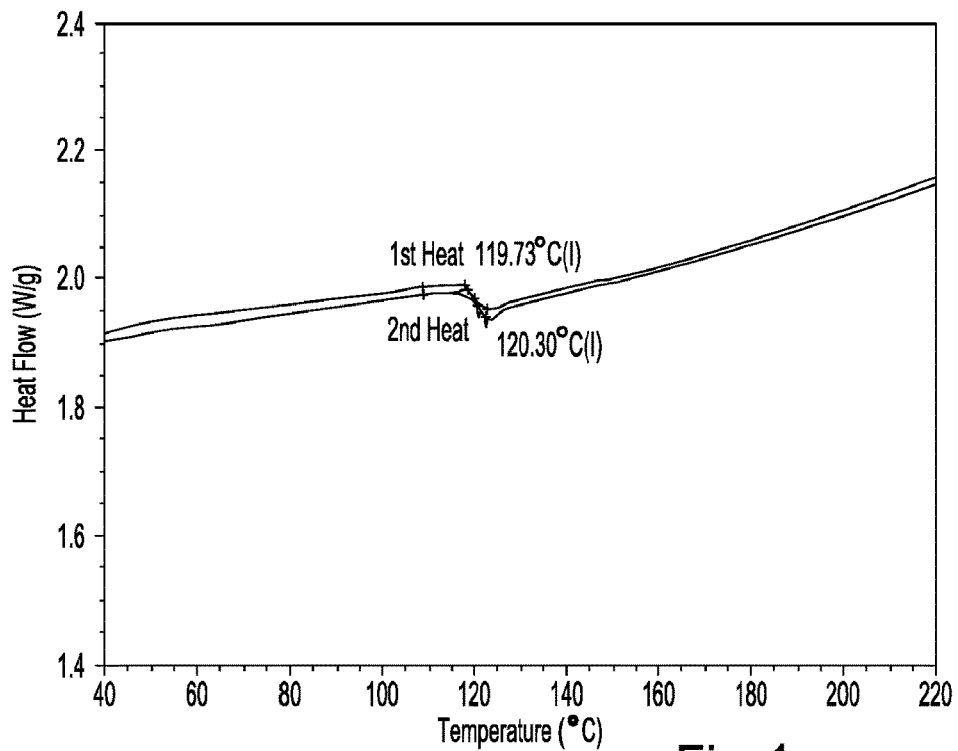
FIGS. 1 and 2 are plots to show expected glass transition temperatures for illustrative polymeric reaction products in accordance with the teachings.

The present teachings meet one or more of the above needs by the improved composite structures and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use.

Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the priority date of U.S. Provisional Application Nos. 62/254,369, filed Nov. 12, 2015 and 62/288,579, filed Jan. 29, 2016, these applications being hereby incorporated by reference for all purposes.

The present teachings envision a unique material system directed toward the realization of a material having (i) various processing characteristics (e.g., viscosity, melt flow rate, or other characteristics suitable for melt processing, such as by extrusion) typical of a thermoplastic polymeric material, and (ii) various performance characteristics (e.g., rigidity, adhesion, elongation, toughness, etc.) typical of a thermoset polymeric material, such as an epoxy. The material system encompasses within its scope a reaction product (which is typically expected to be a polymeric material) arising from a reaction of a unique combination of ingredients for reactants in a reaction mixture. The polymer or any other such reaction product may have a relatively high glass transition temperature ($T_g$), e.g., greater than about 90° C., about 100° C., about 110° C., or about 120° C.

As will be explained, surprisingly, it is possible to react a reaction mixture of at least one diepoxide, and at least one bisphenol, to arrive at the material of the present teachings. For instance, a reactant mixture may include, consist essentially of (e.g., at least about 85% by weight, about 90% by weight, or about 95% by weight of) the reactants (exclusive of catalyst), or consist of at least one diepoxide, and at least one bisphenol. The reactant mixture may include a catalyst or a catalyst mixture. For instance, the catalyst mixture may include, consist essentially of (e.g., at least about 85% by weight, about 90% by weight, or about 95% by weight of) the catalyst, or consist of a non-iminium phosphine catalyst (e.g., triphenylphosphine (PPH3)). The reaction may be in the substantial absence of any solvent, namely a solvent in addition to the main reactants, e.g., it is in the substantial absence of a solvent added to a mixture with the at least one diepoxide and/or the at least one bisphenol. The reaction may be in the substantial absence of any iminium catalyst and/or any other catalyst. It is possible that in addition to or in lieu of the at least one bisphenol, another diol may be employed (e.g., a linear aliphatic diol) in the reaction.

In more detail, the teachings contemplate a material system, which may relate to one or any combination of a method, a reaction product (which may be a polymer), or a formulated compound including the reaction product. The material system envisions a reaction of at least one diepoxide (as illustrated herein) and at least one bisphenol (as illustrated herein) under conditions (e.g., while maintaining a temperature of the reaction mixture not exceeding about 300° C., and particularly not exceeding about 275° C., about 250° C., about 225° C., or about 200° C. (e.g., it may not exceed about 195° C., about 190° C., 185° C., about 180° C.))) throughout substantially the entire reaction period. For example, the amount of time that any of the reaction mixture exceeds about 200° C. is less than about 30%, about 20% or about 10% of the total reaction time. The reaction time may be the amount of time sufficient to form a reaction product having a $T_g$ as measured by differential scanning calorimetry according to ASTM E1356-08(2014) of at least about 90° C., at least about 100° C., at least about 110° C., or at least about 120° C. The $T_g$ may be below about 200° C., below about 185° or below about 170° C.

The reaction conditions may be such that one or any combination of the conditions of the following paragraphs are met. The reaction product may be a catalyzed reaction product of a mixture consisting essentially of at least one catalyst, at least one diepoxide and at least one bisphenol other than bisphenol S. In this regard, the mixture may be free of any sulfur, any ketone moiety, or free of both sulfur and any ketone moiety. However, as will be seen herein, it is possible that a sulfur-containing bisphenol (e.g., bisphenol S) may be employed (e.g., in a reaction that may be devoid of an iminium catalyst as a major portion of the catalyst, employs insignificant amounts of solvent, or both). Such reaction may also be devoid of any catalyst.

The reaction product may be a catalyzed reaction product of the at least one diepoxide and at least one bisphenol in the presence of a catalyst having no more than about 35% by weight of the total catalyst, no more than about 25% by weight of the total catalyst, or no more than about 15% by weight of the total catalyst, or no more than about 5% by weight of the total catalyst of an iminium catalyst. The reaction product may be a catalyzed reaction product of a mixture consisting essentially of at least one a non-iminium phosphine catalyst, at least one diepoxide and at least one bisphenol.

The reaction product may be a reaction product of a mixture including at least one diepoxide and at least one bisphenol in the substantial absence of any solvent. For instance, the amount of any solvent (namely, any organic solvent (e.g., an organic solvent other than one of the reactants) that is typically non-reactive with the diepoxide and/or the bisphenol under the reaction conditions herein) present during any reacting steps may be less than about 40, less than about 30, less than about 20, less than about 10, or less than about 5% by weight of a total reaction mixture. The reaction product may be a reaction product of a reaction mixture of at least one diepoxide and at least one bisphenol in the absence of any solvent.

The reaction product may be a catalyzed reaction product of a reaction mixture including, consisting essentially of (e.g., present along with any catalyst in an amount that is greater than about 85, greater than about 90, or greater than about 95 percent of the mixture), or consisting of at least one diepoxide and at least one bisphenol, reacted in the presence of a catalyst having one or a combination of fewer than six phenyl groups, or a single or at least one phosphorus atom in an oxidation state of 3+. For instance, the reaction product may be a catalyzed reaction product of a reaction mixture of at least one diepoxide and at least one bisphenol, reacted in the presence of a catalyst containing an organophosphorus compound (e.g., a non-iminium phosphine) (e.g., at least about 65%, at least about 75%, at least about 85% or at least about 95%, by weight of the total catalyst is an organophosphorus compound (e.g., a non-iminium phosphine)). By way of illustration, without limitation, the reaction product may be a catalyzed reaction product of a reaction mixture consisting essentially (e.g., present in an amount that is greater than about 85, greater than about 90, or greater than about 95 percent of the mixture) of at least one diepoxide, at least one bisphenol, and a catalyst selected from an organophosphorus compound (e.g., a non-iminium phosphine having a molecular weight below about 500 g/mol, such as triphenylphosphine (PPH3)).

For such material system, the at least one diepoxide may be a diglycidyl ether. The at least one diepoxide may be a diglycidyl ether, having at least one substituted or unsubstituted aryl (e.g., phenol) group. The at least one diepoxide may be selected from resorcinol diglycidyl ether, diglycidyl ether of bisphenol A ("DGEBA"), bisphenol F diglycidyl ether, bisphenol A propoxylate diglycidyl ether, or any combination thereof. The material of the present teachings may employ as its at least one bisphenol ingredient a bisphenol that has a molecular weight of about 200 to about 360 g/mol. The at least one bisphenol may be selected from 4,4'-(1-phenylethylldene) bisphenol; 4,4'-sulfonylbisphenol (Bisphenol S); or a combination thereof.

A polymer or other reaction product of the present teachings may have a relatively high $T_g$, as described in preceding passages. It may be possible to have a $T_g$ in excess of 115° C., in excess of 116° C., in excess of 117° C., in excess of 118° C., in excess of 119° C., or in excess of 120° C., as measured by differential scanning calorimetry according to ASTM E1356-08(2014). The polymer and/or reaction product of the present teachings may have a glass transition temperature as measured by differential scanning calorimetry according to ASTM E1356-08(2014) of below about 200° C., below about 185° C., or below about 170° C. The polymer and/or reaction product of the present teachings may have a glass transition temperature according to ASTM E1356-08(2014) of at least about 120° C., and below about 170° C.

In addition to having a relatively high $T_1$, the polymer and/or reaction product of the present teachings may also have attractive mechanical properties. For example, the polymer and/or reaction product of the present teachings may exhibit one or any combination of the following characteristics: a stress at break (according to ASTM D638-14) of at least about 60 MPa (e.g., at least about 75 MPa), a tensile elongation at break (according to ASTM D638-14) of at least about 60 (e.g., at least about 75 MPa) and/or a modulus of elasticity (according to ASTM D638-14) of at least about 1 GPa (e.g., at least about 2.7 GPa).

In an effort to achieve such mechanical properties, it is also possible that the material include one or more additives. As one non-limiting example, the material may include an additive to improve (e.g., increase) the toughness of the material. Such toughening agent may include a core shell material. Such core-shell particulates may include an elastomeric core (e.g., a cross-linked rubber core). The elastomeric core, for example, may include butadiene. The elastomeric core may include a copolymer of butadiene and styrene. The elastomeric core may include a polymer having at least one silicon atom (e.g., a silicone rubber). The core shell particulates may include a shell that includes a (meth) acrylic acid, an ester thereof, and or a nitrile thereof. For example, the particulates may include a copolymer, such as a copolymer of styrene, methyl methacrylate, glycidyl methacrylate and optionally acrylonitrile. The core-shell particulates may be dispersed in a liquid suspension medium in a range of concentrations (e.g., from about 5% to about 50%, such as about 10% to about 40% by weight of the total dispersion). The core-shell particulates may be dispersed in a liquid suspension medium that may include a liquid resin, such as an epoxy based resin (e.g., diglycidyl ether of bisphenol A, diglycidyl ether of bisphenol F, a reaction product of one or both with another ingredient (such as epichlorohydrin), or any combination of these materials). Examples of commercially available core-shell particulates include those sold by Kaneka Corporation under the designation Kaneka Kane Ace, (e.g., grade 136 (dispersed as a concentrate in a diglycidyl ether of bisphenol F; and/or grade 156 (dispersed as a concentrate in a diglycidyl ether of bisphenol A). For additional guidance, the teachings of U.S. 2007/0027233 may be employed. The liquid suspension medium may be such that the particulates require no separation therefrom prior to mixing with other reactants. Thus, it is possible that the liquid suspension medium will form part of the reactants to form the resulting materials of the present teachings.

The core shell particulates may be characterized by one or more of their physical characteristics. For example, the particulates may be generally spherical. They may have an average diameter of about 0.01 micrometers to about 1 micrometers (e.g., about 0.05 to 0.2 micrometers), measured by scanning electron microscopy. Thus, the core-shell particles may be of generally nanoparticle sizes.

The core shell particulates may be employed in an amount relative to the total amount of the core shell particulates and the thermoplastic epoxy material of up to about 20 percent by weight, up to about 15 percent by weight, up to about 10 percent by weight. The core shell particulates may be employed in an amount relative to the total amount of the core shell particulates and the thermoplastic epoxy material of at least about 1 percent by weight, at least about 3 percent by weight, or at least about 5 percent by weight. Additional examples describing the use of such core shell particulates can be found in U.S. Provisional Application Ser. No. 62/280,934, filed Jan. 20, 2016 and 62/372,551, filed Aug. 9, 2016, the contents of these applications being hereby incorporated by reference herein for all purposes.

For achieving the material of the present teachings, it is contemplated that the at least one diepoxide (e.g., at least one diglycidyl ether) and at least one bisphenol are reacted (in molar amounts) in a ratio of the at least one diepoxide to the at least one bisphenol in a ratio of about 4:1 to about 1:4 (e.g., about 2:1 to about 1:2, or even about 1:1). In regard to the ingredients of a reaction mixture, the at least one diepoxide may have a molecular weight ranging from about 130 to about 460 g/mol (e.g., about 220 to about 350). The at least one diepoxide may include at least one ether linkage. The at least one diepoxide may include only two ether linkages. The at least one diepoxide may include at least one, two or more phenyl moieties. For example, it may have only two phenyl moieties. The at least one diepoxide may include at least one ether linkage between at least one phenyl moiety and an epoxide functional group. The diepoxide may be a diglycidyl ether. For example, the diglycidyl ether may be selected from resorcinol diglycidyl ether, diglycidyl ether of bisphenol A ('DGEBA'), bisphenol F diglycidyl ether, bisphenol A propoxylate diglycidyl ether, or any combination thereof. As gleaned elsewhere herein, the diepoxide may include one or more substituted or unsubstituted moieties. For example, it may have at least one substituted aryl group.

The material of the present teachings may employ as its at least one bisphenol ingredient of the reaction mixture a bisphenol that has a molecular weight of about 180 to about 440 g/mol, e.g., about 200 to about 360 g/mol. The chemical structure of the at least one bisphenol may include a pair of opposing substituted or unsubstituted phenolic moieties. The chemical structure may include a bridge that links the pair of opposing substituted or unsubstituted phenolic moieties. Any such bridge may include a bridging atom selected from at least one of carbon or sulfur. The bridge may include a substituted or unsubstituted pendant alkyl and/or aryl moiety.

The at least one bisphenol may be selected from 4,4'-(1-phenylethylidene) bisphenol; 4,4'-sulfonylbisphenol; or a combination thereof.

It is possible to selectively control types and amounts of reactants to control the resulting glass transition temperature of the material, in accordance with the general teachings.

It is also possible to employ one or more ingredients in addition to or in lieu of the bisphenol. For example, one or more diols other than a bisphenol may be employed, such one or more diols may be an aliphatic diol. The dial may be an oligomer or a polymer. An aromatic diol may also be employed instead of or in combination with an aliphatic diol. It may be a diol having a molecular weight of up to about 20,000 grams/mol, or even up to about 100,000 grams/mol. It may have a molecular weight of at least about 100 grams/mol.

Another example of a starting material may be a polycyclic aromatic hydrocarbon based epoxide, such as a fluorene. An example of such a fluorene is 9,9-Bis[4-(glycidyloxy)phenyl]fluorene. For example, it may be employed for reacting with a diepoxide of these teachings, with or without a catalyst.

The amount of any catalyst employed may be an amount sufficient for catalyzing the reaction of the diepoxide and the bisphenol. For example, it may range from about 1 part by weight catalyst to about 0.001 to about 8 percent by weight of catalyst relative to the total amount of diepoxide and bisphenol of the starting reaction mixture, e.g., from about 0.01 percent by weight catalyst to about 5 percent by weight of both of the total diepoxide and bisphenol of the starting reaction mixture. The amount of catalyst may be toward the higher end of the range, e.g., from about 3.5 percent by weight catalyst to about 7.5 percent by weight of both of the total diepoxide and bisphenol of the starting reaction mixture. The amount of any catalyst employed may be below about 10 mol percent of the entire reaction mixture.

In connection with the preparation of the materials herein, it is envisioned that care is taken to avoid or help minimize the occurrence of polymerization chemical reactions that are other than a reaction between hydroxyl groups from the bisphenol and the oxirane ring of the diepoxide. Moreover, desirably, steps may be employed to substantially avoid reaction of free hydroxyl groups in a branched manner, and/or to control the extent of branching by virtue of reactions with free hydroxyl groups (e.g., to form a partially cross-linked network). The reaction of the teachings herein is envisioned to result in a generally linear reaction product. The reaction of the teachings herein is envisioned to result in a reaction product that has less than about 25% by weight of a gel, less than about 15% by weight of gel, or is substantially devoid of any gel (e.g., it is less than about 5% by weight gel), and/or has less than about 20% by weight, less than about 10% by weight, or is substantially devoid of (e.g., it has less than about 5% by weight of reaction product) cross-linked reaction product.

By way of example, the desired proportion of reactants may be introduced into a reaction site (e.g., a vessel). For example, reactants may be introduced by feeding a stream of the reactants in fluidic form (e.g., as a liquid or other flowable form). One or more of the reactants may be introduced as a solid material (e.g., in a particulated form), which is capable of becoming a liquid when subjected to heat within the reaction site. At least one stream may include only one or each (e.g., in the form of a reaction mixture) of the diepoxide and bisphenol reactants, with or without catalyst. Within the reaction site, a reaction mixture may be introduced and/or prepared. Heat may be applied to the reaction mixture (e.g., to a temperature of at least about 140° C. and below about 300° C., below about 275° C., below about 250° C., below about 225° C., or below about 200° C.) for a suitable time. Heating of the reaction mixture in the reaction site may be for about 1 minute to about 4 hours. One approach may be to employ at least two feeds (one for each of the diepoxide and bisphenol reactants). In the case when multiple feeds are employed, they may be supplied at similar or different flow rates relative to each other. Within the reaction site there may be catalyst present. It may be pre-existing in the reaction site and/or fed into the reaction site. An amount of the catalyst may be fixed within the reaction site, and/or it may be flowed into the reaction site. Upon exit of reaction site, the reaction product is cooled, where it will effectively solidify. It may be desired to avoid gelling during any reaction. It may be possible to achieve that by reacting at a temperature in the range of about 140-300° C. (e.g., about 150° C. to about 200° C.) for a period of about 1 minute to about 4 hours.

One or more steps of forming a resulting reaction product into a suitable form may be employed. For example, reaction product may be extruded through one or more dies; a body of reaction product may be cut into a plurality of pieces of the body; reaction product may be cast; reaction product may be processed through relatively fine holes of a spinneret, or otherwise processed for forming a plurality of fibers; reaction product may be drawn; reaction product may be twisted; reaction product may be blown or otherwise formed into a film; reaction product may be comminuted or otherwise particulated (e.g., for subsequent use as a feed material, such as for molding (e.g., injection molding, blow molding, rotational molding, and/or extruding)); reaction product may be formed into a sheet (e.g., which may be subsequently formed, such as by thermoforming).

The materials or reaction products of the present teachings may be prepared in bulk by batch processing, or in a continuous manner.

Two particular examples of basic reactions in accordance with the teachings are shown below, with the symbol "φ" denoting an unsubstituted or substituted aryl group, namely phenyl. For convenience, illustrative examples of the bisphenol are shown as "PEB" (4,4'-(1-phenylethylidene) bisphenol) and bisphenol S (4,4'-sulfonylbisphenol). The repeat unit for a resulting polymer or other reaction product is shown as well.

molecular weight ranging from about 1000 to about 200,000, about 5000 to about 150,000, or about 10,000 to about 100,000, as measured by gel permeation chromatography. Polymers of the teachings may have below about 50% by weight, below about 25% weight, below about 15% by weight, below about 5% weight, or below about 3% by weight of total crystallinity, as measured by differential scanning calorimetry. Polymers may have a total crystallinity of about 0 weight % or more, or about 1 weight % or more, as measured by differential scanning calorimetry. Polymers of the teachings may result in a change of crystallinity during the course of its service life in an intended application. The polymers of the teachings may have below about 50% by weight, below about 25% by weight, below about 15% by weight, below about 5% by weight, or below

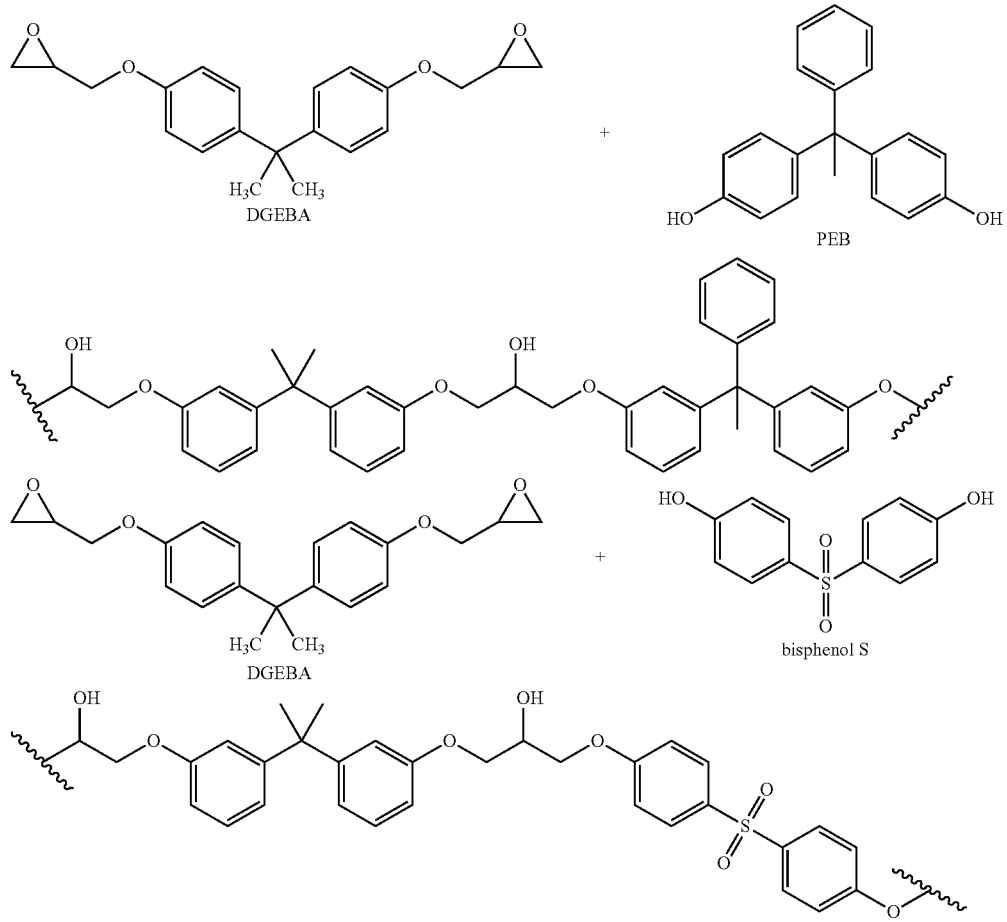

The polymers and reaction products of the present teachings are envisioned to include, in an amount of at least about 50, at least about 60, at least about 70, at least about 80 or at least about 90% (by weight) (as measured by Fourier transform infrared characterization), of a generally linear backbone, thereby rendering it generally able to function as a thermoplastic material for purposes of processing, reclaiming and/or recycling.

Polymers of the teachings may employ a plurality of repeat units along the backbone. There may be at least about 15, at least about 25, or at least about 35 repeat units. There may be less than about 1000, less than about 750, or less than about 500 repeat units. Polymers may have a weight average about 3% by weight of total crystallinity, as measured by differential scanning calorimetry during the entirety of its expected service life in an intended application. Polymers may have a total crystallinity of about 0 weight % or more, or about 1 weight % or more, as measured by differential scanning calorimetry during the entirety of its expected service life in an intended application. Higher crystallinity amounts are also possible for the polymer materials herein, provided that the polymer materials remain essentially free of an amount of cross-linking that would preclude processing of the material using processing techniques (e.g., extruding, molding (e.g., injection molding or otherwise)) that typically are employed to process thermoplastic materials.

It is also contemplated that the teachings may be employed to make foamed materials. A chemical and/or physical blowing agent may be incorporated which liberates gas or otherwise forms a porous structure. Sufficient foaming may occur to reduce the density of the material by at least about 10, 30, 50 or even 70%, as compared with the material density in an unfoamed state. It is possible that a blowing agent is mixed with ingredients prior to reaction of the ingredients to form the reaction products and polymers of the teachings. A foamed reaction product may thus result. It is possible that a blowing agent is mixed with ingredients prior to reaction of the ingredients to form the reaction products and polymers of the teachings. A foamed reaction product may thus result. Foaming may occur during a reacting step. It is possible that a blowing agent is mixed with ingredients after reaction of the ingredients to form the reaction products and polymers of the teachings. A foamed reaction product may thus be delayed until a predetermined condition occurs. It is possible that a blowing agent is added when the reaction product or polymer of the present teachings is blended or compounded with other ingredients for forming a compounded product.

One approach to creating a foamed material may include a step of introducing a physical and/or a blowing agent so that the resulting polymer is a foam. Suitable art-disclosed blowing agents may be employed in art-disclosed amounts. A possible approach may include a step of reacting ingredients herein in the presence of such a blowing agent. A one or two component system may be employed for creating a foamed material. The epoxy resin and the blowing agent (e.g., a carbonate, (which may be employed with or without a suitable acid), or other chemical and/or physical blowing agent) may be mixed together and optionally stored together while the esterified reaction product is isolated from them prior to reaction.

Suitable carbonates (e.g., an encapsulated carbonate (such as a metal carbonate (e.g., calcium carbonate encapsulated in a wax or polymeric coating)) may be employed, consistent with the teachings of U.S. Pat. No. 6,730,713, incorporated by reference.

The reaction of the teachings herein may be completely free of any amine or amine adduct as a reactant or at least contain amine in an amount that is less than about 10%, less than about 5%, or even less than about 3% of the total moles of reactants. Any amine present may be in a proportion (by moles) of about 0.01:1, relative to the epoxide reactant, or about 0.1:1, or even about 0.2:1. To the extent any amine is employed, it may be a monoamine.

The teachings herein may be free of any step of reacting an amine with any of the reaction products. The teachings herein contemplate that any of its methods may be free of any step of forming any amine adduct, and/or any reaction product is free of any amine adduct. The teachings reaction product may be a reaction product of a mixture of at least one diepoxide and at least one bisphenol in the substantial absence of any compound having a ketone moiety (e.g., any reaction used employs less than about 0.1 mol percent of any compound having a ketone moiety (e.g., 4,4'-Dihydroxy-benzophenone)). The reaction temperature to achieve the materials of the present teachings may not exceed about 300°, and particularly may not exceed about 275°, about 250°, about 225° C., or about 200° C. (e.g., it may not exceed about 195° C., about 190° C., 185° C., about 180° C.)). The reaction product may be a reaction product of a substantially equimolar or non-equimolar mixture of at least one diepoxide and at least one bisphenol. Though examples of illustrative reactants are provided, and a method is illustrated, the teachings also encompass a material (e.g., a polymer) prepared using other reactants and/or by another method, to the extent that the materials have the specified composition and/or characteristics.

For the reactions of the present teachings, it is envisioned that at least one of the reactants (e.g., the reactants (with or without any catalyst)) is heated to above a temperature at which the reactant liquefies. Upon liquefication, another of the reactants may be introduced to the liquefied material. Prior to, during, or after such introduction, such added reactant may be caused to liquefy. Any of such reactants may exist in a liquid state at about room temperature.

It is possible that one of the reactants (e.g., the reactants (with or without any catalyst)) may be heated to a temperature sufficient to cause another of such reactants to liquefy from a solid state.

Materials made herein have a number of applications, and the teachings contemplate use of the materials in such applications as well as articles made with the materials and adapted for use in such applications. By way of example, the teachings herein can be employed for filling and/or structurally reinforcing a cavity (e.g., of a transportation vehicle, such as a cavity of a vehicle body frame). Materials herein may be employed as an adhesive. They may be employed as a structural reinforcement material. They may be employed as a material for acoustic modification, for adhesive bonding, as a film, as a powder, as a fiber, in a dispersion (e.g., for use as a coating) or any combination thereof. The materials may be employed as a matrix for a composite, as a layer in a composite laminate, as an additive to a formulated composition (e.g., a structural adhesive), as an additive to a polymer system for improving or maintaining elongation and/or toughness characteristics. The materials may be employed in applications as a printable surface onto which ink is printed. The materials may be employed as part or all of a binder of an aggregate. The materials may be employed as part or all of a primer, an adhesive, and/or other surface coating. The materials may be employed in an adhesive joint. The materials may be employed in an adhesive joint between similar and/or dissimilar materials (e.g., between metals, such as one or any combination of steel, aluminum, magnesium, titanium or otherwise). The materials herein are capable of satisfying the harsh environmental and durability testing conditions known in the art (e.g., peel strength and/or shear strength in the presence of salt spray, humidity, thermal cycling, ultraviolet radiation, etc.).

Materials according to the present teachings may have a generally linear backbone and may also have at least one ether linkage in repeating units of the generally linear backbone. Materials according to the present teachings may be free of crosslinking, or of any thermoset portion chemically bonded to a generally linear backbone.

For compounds described herein that contain one or more aryl moiety (e.g., phenyl) the moiety may be substituted or unsubstituted. For example, when a substituted moiety is employed it may have an alkyl (e.g., a C1-C12 alkyl), aryl, and/or cyclohexyl substituent.

The reaction mixtures of the teachings herein may include polycyclic aromatic hydrocarbon (e.g., a fluorene). Such polycyclic aromatic hydrocarbon (e.g., a fluorene) may be employed in addition to, or lieu of some or all of the diepoxide, the bisphenol or both, of the present teachings.

The teachings herein also contemplate formulations that include a mixture of a material of the teachings with a filler (e.g., an organic filler, an inorganic filer or both), a reinforcement (e.g., an organic fiber, an inorganic fiber, or both), a curing agent, a colorant, a light stabilizer, a chain terminator or other additive (e.g., as described in Col. 6 of U.S. Pat. No. 6,803,004) a processing aid, a flame retardant, such as a phosphorus containing flame retardant (e.g., as described in U.S. Patent Application Ser. No. 62/208,236, filed Aug. 21, 2015 (incorporated by reference)), or otherwise. For possible ingredients, see e.g., U.S. Pat. Nos. 5,648,401, and 6,730,713, both incorporated by reference. An example of a possible filler that may be employed is described in United States Patent Application Publication No. 20090298974, and may include fibers or particles of naturally occurring organic materials, such as wood flour (incorporated by reference; see, e.g., paragraphs [0031]-[0032]). Thus, use of the teachings herein may result in a material that exhibits sufficient flame retardancy to meet one or more of the requirements for demonstrating flame retardancy (e.g., to meet vertical burn and/or smoke density requirements (or some other requirement) as set forth in 14 C.F.R. § 25.853 and 14 C.F.R. § 25.856 (the United States Code of Federal Regulations for compartment interiors, including but not limited to 14 C.F.R. § 25.853(a), and the referenced Appendix F and procedures referenced therein), all of which are incorporated by reference for all purposes).

Example 1

A mixture of diglycidyl ether of bisphenol A (about 5.4 grams (g)) and 4,4'-(1-phenethylethyidene) bisphenol (about 4.6 g) is prepared. The 4,4'-(1-phenylethylidene) bisphenol is heated to a temperature of about 200° C. for causing it to liquefy. The diglycidyl ether of bisphenol A is rapidly mixed with the liquefied 4,4'-(1-phenylethylidene) bisphenol. A catalyst is added to the mixture (about 0.08 g of triphenylphosphine) and the resulting mixture (which is contained in a glass reaction vessel) is covered and heated at about 170° C. for about 3 hours. Resulting reaction product polymer (bisphenol A-co-4,4'-(1-phenylethylidene) bisphenol) is tested for glass transition temperature using dynamic colorimetry with a Universal V4.4A TA Instrument, in accordance with according to ASTM E1356-08(2014). Results are shown in the plot of FIG. 1.

Example 2

Figure 2:
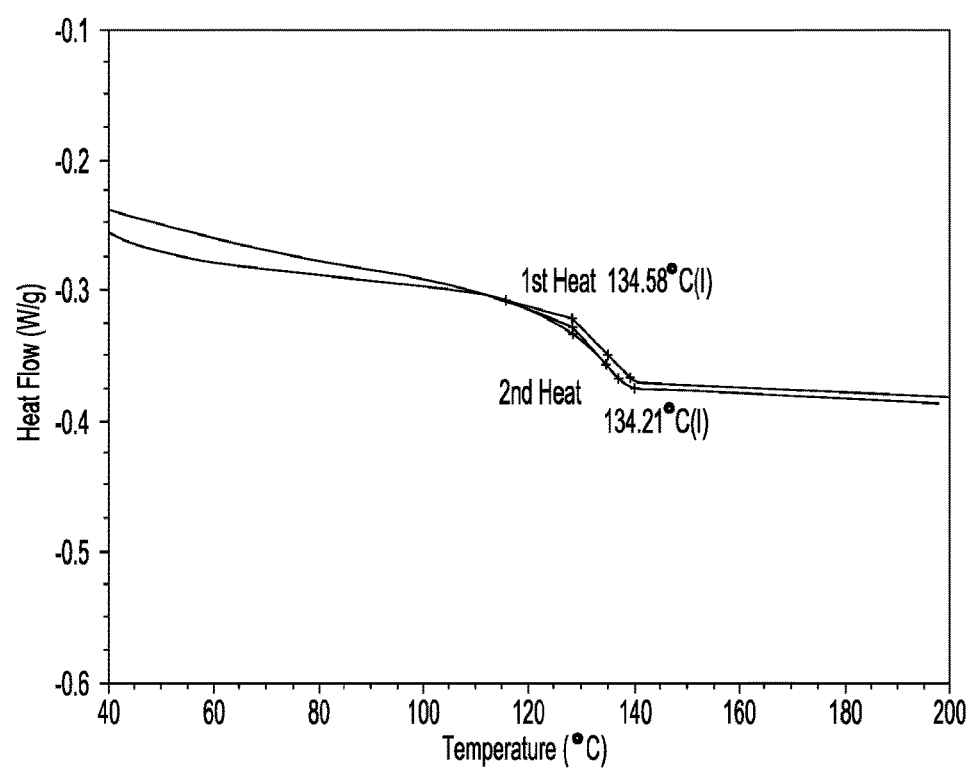

A mixture of diglycidyl ether of bisphenol A (about 7.5 grams (g)) and 4,4'-sulfonylbisphenol (about 5.6 g) is prepared. The 4,4'-sulfonylbisphenol is heated to a temperature of about 260° C. and held for a period of about 25 minutes for causing it to liquefy. To the liquefied 4,4'-sulfonylbisphenol, a catalyst is added (about 120 mg triphenylphosphine). That mixture remains heated at about 260° C. while contained in a glass reaction vessel. Into that mixture, about 7.5 gm of diglycidyl ether of bisphenol A is added gradually over period of about 5 minutes while stirring. Upon conclusion of the addition of the diglycidyl ether of bisphenol A, reaction product forms, and then is cooled by exposure to ambient. Resulting reaction product polymer (Bisphenol A-co-4,4'-sulfonylbisphenol) is tested for glass transition temperature using dynamic colorimetry with a Universal V4.4A TA Instrument, in accordance with according to ASTM E1 356-08(2014). Results are shown in the plot of FIG. 2.

As used herein, "liquefied" or "liquid" refers to a state of a substance for which the substance has a viscosity sufficient to enable formation of a substantially homogeneous mixture with another substance when brought into contact with each other. The viscosity of a "liquefied" or "liquid" substance at a given temperature (measured by ASTM D445-15) may be below about 25,000 centipoise (cps), about 15,000 cps, about 5000 cps, about 1000 cps, about 500 cps, about 150 cps, or even about 80 cps, about 50 cps or about 20 cps.

As used herein, unless otherwise stated, the teachings envision that any member of a genus (list) may be excluded from the genus; and/or any member of a Markush grouping may be excluded from the grouping. When the use of "a" is employed herein, unless otherwise specified, or it is clear from the text, "a" envisions one or more. Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition."

Unless otherwise stated, all ranges include both endpoints and all numbers between the endpoints. The use of "about" or "approximately" in connection with a range applies to both ends of the range. Thus, "about 20 to 30" is Intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements, ingredients, components or steps that do not materially affect the basic and novel characteristics of the combination. For example, unless otherwise stated, in the context of the present teachings, a combination described as consisting essentially of any particular elements may permit for the presence of other elements, components, ingredients or steps that do not alter a $T_g$ of a material by +/−3□C as compared with a material without such elements, components, ingredients, or steps. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A polymeric material comprising a reaction product of at least one diepoxide and at least one bisphenol selected from 4,4'-(1-phenylethylidene) bisphenol, 4,4'-sulfonylbisphenol, or a combination thereof, in the presence of a catalyst; wherein the catalyst is triphenylphosphine; wherein the reaction product is a reaction product of a substantially non-equimolar reaction mixture of the at least one diepoxide and the at least one bisphenol; wherein the reaction product has a $T_g$ as measured by differential scanning calorimetry, according to ASTM E1356-08(2014), of at least about 120° C. and below about 170° C.; wherein the polymeric material is a thermoplastic; and wherein one or any combination of the following conditions are met:
    (a) the reaction product is a catalyzed reaction product of a reaction mixture consisting essentially of the at least one diepoxide and the at least one bisphenol that is free of any sulfur, any ketone, or both any sulfur and any ketone moiety;
    (b) the reaction product is of a reaction mixture of the at least one diepoxide and the at least one bisphenol in substantial or complete absence of any solvent; or
    (c) the reaction product is of a reaction mixture of the at least one diepoxide and the at least one bisphenol in substantial absence of any ketone.

2. The polymeric material of claim 1, wherein the reaction product exhibits one or any combination of the following characteristics: a tensile strength at yield, according to ASTM D638-14, of at least about 15 MPa; a tensile elongation strength at break, according to ASTM D638-14, of at least about 45 MPa; an elongation at break, according to ASTM D638-14, of at least about 15%; and/or a tensile modulus of elasticity, according to ASTM D638-14, of at least about 0.5 GPa.

3. The polymeric material of claim 1, wherein the at least one diepoxide and the at least one bisphenol are reacted, in molar amounts, in a ratio of the at least one diepoxide to the at least one bisphenol of about 4:1 to about 1:4, excluding 1:1.

4. The polymeric material of claim 1, wherein the at least one diepoxide has a molecular weight ranging from about 130 g/mol to about 460 g/mol.

5. The polymeric material of claim 1, wherein the at least one diepoxide is a diglycidyl ether.

6. The polymeric material of claim 5, wherein the at least one diepoxide is a diglycidyl ether having at least one phenyl group.

7. The polymeric material of claim 5, wherein the at least one bisphenol has a molecular weight of about 200 g/mol to about 360 g/mol.

8. The polymeric material of claim 6, wherein the at least one diepoxide is selected from resorcinol diglycidyl ether, diglycidyl ether of bisphenol A, bisphenol F diglycidyl ether, bisphenol A propoxylate diglycidyl ether, or any combination thereof.

9. The polymeric material of claim 1, wherein the reaction product is of a reaction mixture of the at least one diepoxide and the at least one bisphenol in substantial or complete absence of any solvent.

10. A polymeric material consisting essentially of a reaction product of at least one diepoxide and at least one bisphenol selected from bisphenol S, 4,4'-(1- phenylethylidene) bisphenol, or both, in the presence of a catalyst; wherein the catalyst is triphenylphosphine; wherein the reaction product is of a substantially non-equimolar reaction mixture of the at least one diepoxide and the at least one bisphenol; wherein the reaction product has a $T_g$ as measured by differential scanning calorimetry, according to ASTM E1356-08(2014), of at least about 120° C. and below about 170° C.; and wherein the polymeric material is a thermoplastic.

11. The polymeric material of claim 10, wherein the reaction product is of a reaction mixture of the at least one diepoxide and the at least one bisphenol in substantial or complete absence of any solvent.

* * * * *